(12) United States Patent
Sassin

(10) Patent No.: US 6,381,645 B1
(45) Date of Patent: *Apr. 30, 2002

(54) METHOD OF IMPLEMENTING PUSH TECHNIQUES IN CONVENTIONAL WEB BROWSERS

(75) Inventor: Michael Sassin, San Jose, CA (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,297

(22) Filed: Dec. 8, 1997

(51) Int. Cl.[7] .............................................. G06F 15/16
(52) U.S. Cl. ........................ 709/227; 709/218; 709/203
(58) Field of Search ..................... 395/500.48; 709/201, 709/218, 203, 228, 227; 370/401

(56) References Cited

U.S. PATENT DOCUMENTS 5,754,830 A * 5/1998 Butts et al. ............ 395/500.48
5,802,299 A * 9/1998 Logan et al. ................ 709/218
5,838,682 A * 11/1998 Dekelbaum et al. ........ 370/401
5,861,883 A * 1/1999 Cuomo et al. ............... 709/201
5,890,129 A * 3/1999 Spurgeon ........................ 705/4
5,892,909 A * 4/1999 Grasso et al. ............... 709/201
6,035,332 A * 3/2000 Ingrassia, Jr. et al. ...... 709/224
6,125,402 A * 9/2000 Nagarajayya et al. ....... 709/304
6,175,877 B1 * 1/2001 Zerber ........................ 709/217

FOREIGN PATENT DOCUMENTS

WO     WO 97/12448      * 4/1997

* cited by examiner

*Primary Examiner*—David Wiley
*Assistant Examiner*—Philip B. Tran

(57) ABSTRACT

A web browser (54) downloads a JAVA applet (84) from a web server (52) that maintains an IP connection between a customer's browser program and a push server. A sales or service representative interacts with a terminal (58) to view web pages on the web server. When the representative desires the customer to receive a desired web page, the representative selects a "follow me" control on the terminal. The follow me control directs the push server to transmit an address of a web page to the applet. The applet in turn forwards the address to the web browser program to download a new web page. The present invention is used to transmit information to a web browser program that may be connected to other web sites.

4 Claims, 4 Drawing Sheets

METHOD OF IMPLEMENTING PUSH TECHNIQUES IN CONVENTIONAL WEB BROWSERS

FIELD OF THE INVENTION

The present invention relates to computer systems in general, and in particular to web browser computer programs for the Internet, LAN, or similar networks.

BACKGROUND OF THE INVENTION

As computers having the ability to connect to global wide area computer networks, such as the Internet, are becoming more common, many companies are using such networks as a sales and support tool. Customers or clients can access a company's Internet or World Wide Web site using a web browser program and view sales or service information, while simultaneously talking to a sales or service representative. The representative, who is also connected to the company's web site, can direct the customer to information that is pertinent to their needs.

In order to facilitate the flow of information between a company representative and a customer, it is important that the sales or service representative and customer be viewing the same web page. If it is known that the customer is connected to the company's web site, then it is easy for the representative to get the customer to download information from a specific web page. Alternatively, customers having web browser programs with "push" capability can receive information at the direction of the representative even when their browser application is not connected to the source web site. Neither solution has proved entirely acceptable. First, it cannot always be guaranteed that a customer's browser will be connected to a company's web site when the representative wishes to download information to the customer. Therefore, the sales or service representative must ask the user to type in the address of the web site having the information that the user desires. This process is not only time consuming but is prone to error (and thus cost prohibitive). Secondly, not all customers are equipped with web browser programs having push capability.

Given the shortcomings in the prior art, there is a need for a method of allowing a sales or service representative to have control over the information that is presented to a customer's web browser program without additional interaction from the customer, regardless of whether the customer's browser is currently connected to the company's web site or without requiring the use of web browser programs having push capability.

SUMMARY OF THE INVENTION

The present invention is a method for allowing a remotely-located user to control the information that is displayed on a customer's browser program. When a customer logs into a company's web site, JAVA™ applet is downloaded from the web site to the customer's browser program. The applet maintains an IP connection between the browser program and a push server. When the remote user desires to download a new web page to the browser program, the push server transmits a web address of this web page to the applet. The applet receives the address and forwards it to the browser program which downloads the new page.

In particular, the present invention allows the sales or service representative to assume control over the user's browser program. Each time the representative desires to download a new web page to the customer, the remote user selects a "follow me" control which causes the push server to transmit a web address to the applet.

The present invention therefore simulates push techniques using only a JAVA-compatible web browser program and the JAVA applet.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a method of controlling a customer's web browser program to display information, regardless of whether the web browser is currently connected to a source web site. The present invention therefore allows a remote user to download information to the customer without requiring the user to manually enter a web address or to be running a browser program that incorporates push technology.

Figure 1:
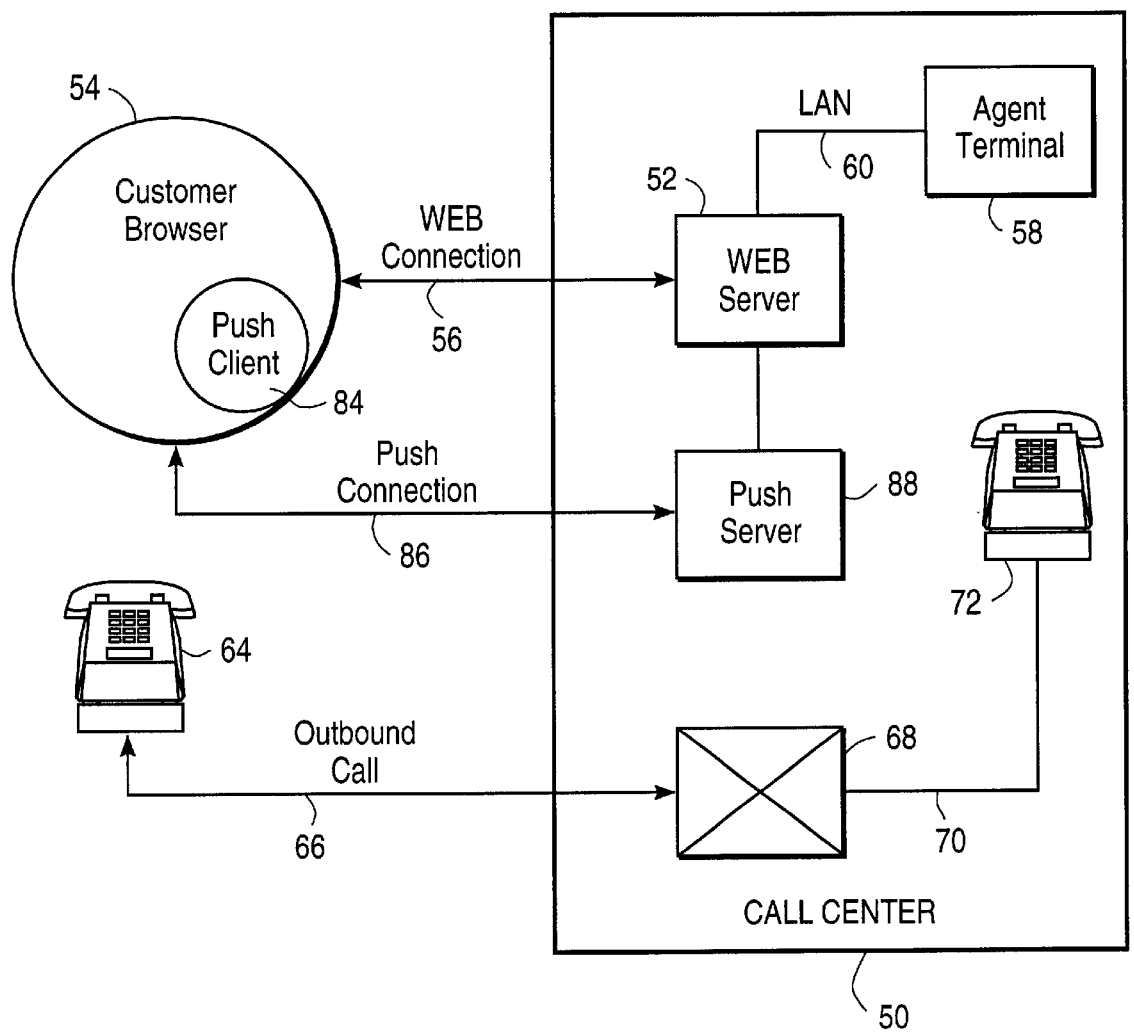
FIG. 1 is a block diagram of a computerized customer call center in which the present invention is utilized.

FIG. 1 illustrates a customer call center, where customers can speak with a sales or service representative via a telephone connection (e.g., via the public switched telephone network or PSTN), and view information that is transmitted over a global wide area computer network such as the World Wide Web in order to obtain sales or service information. The customer service center 50 includes an Internet or World Wide Web server 52 that is accessible using a web browser program 54 that is operating on a customer's computer. Information in the form of web pages is transmitted from the web server 52 to the browser 54 over an Internet Protocol (IP) connection 56 using the HTTP protocol in a manner well known to those of ordinary skill in the art. An agent terminal 58 is also coupled to the web server 52 by a local area network 60. A sales or service representative can access the web server 52 from the agent terminal 58, so that the sales or service representative can view the same information that is transmitted to the customer's web browser 54.

For customers requiring more than the information that is available on the web server 52, or requesting service such as a call back at a later point in time, the customer downloads a registration form and enters their personal data such as their name, telephone number and e-mail address. The content of this form is sent back to the web server 52 so that a customer representative will call them back at some time in the future.

The customer has a telephone 64 which is coupled via the public switched telephone network 66 to a private branch exchange 68 within the call center 50. Also coupled to the private branch exchange 68, via an internal telephone line 70, is an agent's telephone 72. When the time comes for the sales or service representative to contact the customer, the representative is connected by a computer telephony integration application (CTI application, not shown), via the telephone 72 and the private branch exchange 68 to the customer's telephone 64, in order to provide any information that the customer desires. Although the telephone connection is shown using the public switched telephone network, it will be appreciated that IP-based telephony system could also be used such as that specified by the H.323 standard.

As discussed above, if it is known that the customer's web browser program 54 remains connected to the web server 52, the sales or service representative ask the customer to download web pages using a common gateway interface (CGI). However, in many instances, the sales or service representative cannot call back the customer immediately, and therefore the customer may have directed their browser program to other web servers after completing the registration page and requesting a call back. If the customer has a conventional browser program or a program that lacks push capability, when the sales or service representative calls the customer, the representative must ask the customer to type in the address of a web page stored on the web server 52 in order to provide the customer with the information they desire, or which the sales or service representative wants to present to the customer. These addresses are often cumbersome, and relaying the information correctly can take a significant amount of time, thereby significantly increasing the cost for a call center operation.

To facilitate the transmission of information between the sales or service representative and the customer, the present invention utilizes a push applet 84 which is downloaded to the customer's browser program 54 when the registration form is received from the web server 52. As will be explained in further detail below, the push applet 84 is a JAVA™ applet that maintains a socket IP connection 86 to a push server 88 that is located at the same computer as the web server 52. This socket connection is maintained even though the customer's browser program 54 may have subsequently downloaded other web pages located at another web server. With the push applet 84 running, the push server 88 transmits a web address over the IP connection 86 to the push applet 84. The push applet 84 forwards the received web address to the customer's browser program 54, which causes the browser program to connect to the web address provided.

As will be explained in further detail below, the push applet 84 determines the web address of the push server 88 at the time it is downloaded from the web server 52 to the customer's web browser program 54. The push applet 84 continues to monitor the IP connection 86 for packets that are transmitted from the push server 88. Upon detecting a packet from the push server 88, the applet 84 assembles a web address and provides the address to the browser program 54. As a sales or service representative becomes available to call a customer back, the CTI application makes an outgoing call to the customer's phone 64 and connects the agent via the phone 72 with the customer.

During this phase, the customer's information provided via the registration form is forwarded to the sales or service representative's terminal 58. Additionally, a connection via IP is made between the representative's terminal 58 and the push server 88 with the purpose of joining the session between the push applet 84 and the push server 88.

The push applet 84 allows the representative to take control of the customer's browser program 54. The screen viewed by the sales or service representative on the terminal 58 includes a "follow me" control. The representative uses their own browser program running on the terminal 58 to navigate to different web pages on the web server 52, until a page that contains the information that the customer desires is seen. The representative then selects the "follow me" control to cause the push server 88 to transmit the address of the web page selected to the push applet 84 residing at the customer's browser 54. In this way, the representative does not have to instruct the customer to navigate their own way to the web page desired.

Figure 2A:
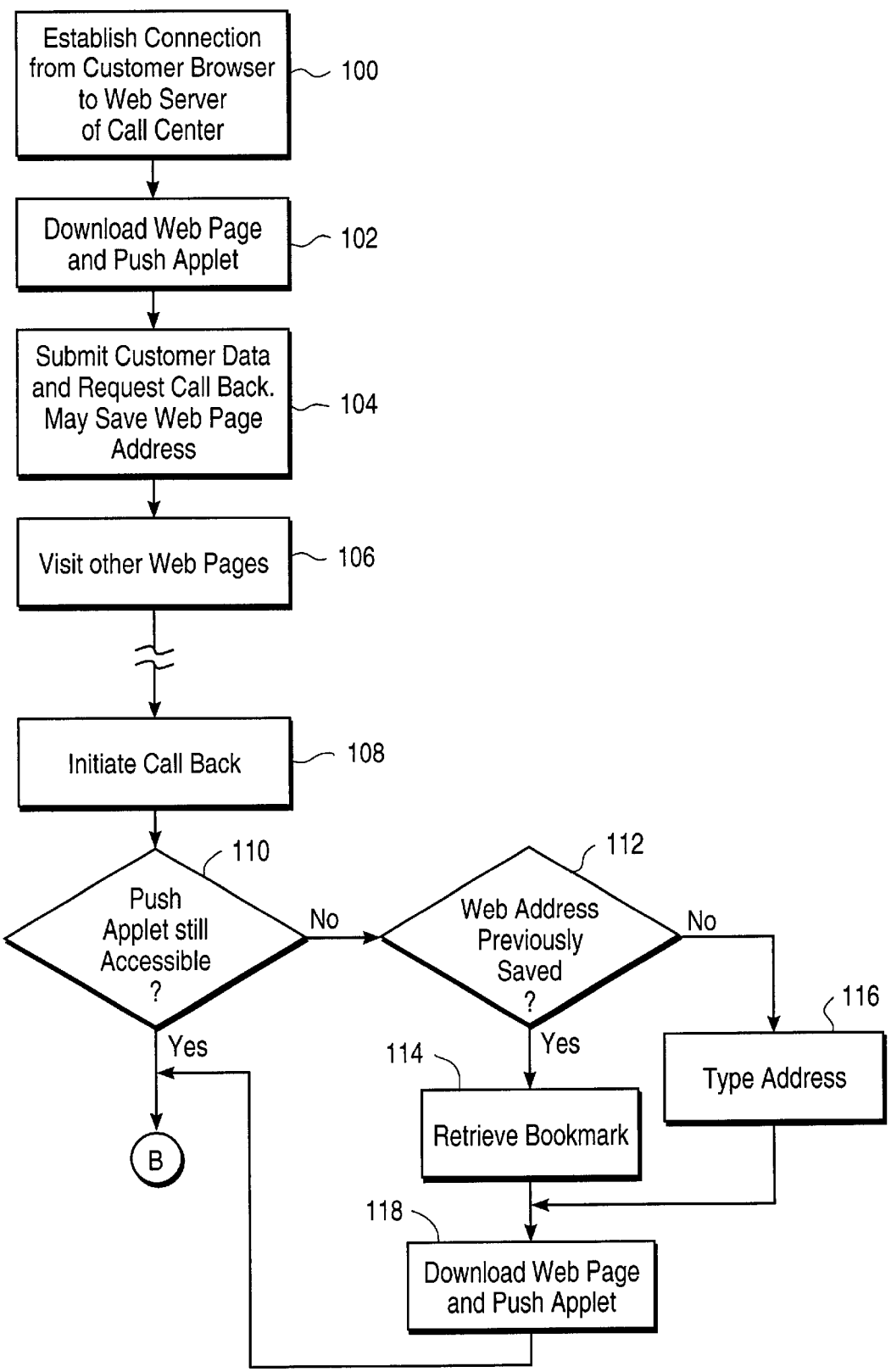
FIGS. 2A and 2B illustrate the steps performed by the present invention to allow a remote user to control the information that is displayed on a customer's web browser program.

FIG. 2A illustrates the steps performed by the present invention to download information to a customer regardless of whether the customer's browser program is currently connected to a company's web server. Beginning with a step 100, the customer establishes a connection from their browser program to the web server of the call center. At a step 102, the web server downloads an initial registration web page including a call back request form as well as the push applet described above. At a step 104, the customer enters their personal data including their name, telephone number, e-mail address, etc., into the call back request form and returns the contents of the form to the web server to request that a sales or service representative contact them. In addition, the customer may be directed to save the address of a dynamically generated login web page that was downloaded as a bookmark. At a step 106, the customer is free to direct their browser program to other web sites.

When the time comes to contact the customer, the CTI application calls the customer and connects the customer with the sales or service representative at step 108. At a step 110, the push server determines whether the push applet that was downloaded at step 102 is still accessible. This is accomplished by sending a packet which is addressed to the applet from the push server and waiting for a reply. If the push applet is still monitoring the IP connection to the push server, it receives the packet and sends a reply indicating that the applet is still operating. If no reply is received, the push server assumes the applet is no longer running and alerts the sales or service representative.

To begin a session with the sales or service representative, the customer must direct his or her web browser to a login page. If the login page is dynamically generated, then the representative asks the user whether the web page that was downloaded at step 102 was previously stored as a bookmark at step 112. If so, the user is then asked in step 114 to direct their browser to the web page referred by the bookmark. Since the dynamically-generated web page might be accessed by another person other than the customer, the login web page should be protected. For example, the login web page can only be accessed from the same computer used to request the call back. This can be done using an HTML protocol "cookie" or a JAVA applet. Furthermore, the name of the web page can consist of a long file name with a randomly generated number similar to the approach used with credit card numbers.

If the login page is not dynamically generated, or the bookmark was lost or not previously stored, the customer must manually enter an address of the login web page at a step 116. In addition, the customer must provide a user name and password or a session number. The required password or session number can be provided to the customer as part of the confirmation web page received in response to the submission of the registration form, or as part of an initial conversation between the customer and the sales or service representative. Whether the stored bookmark is retrieved or an address is manually entered, the web server 52 returns the login web page. The login web page can be a dynamically-generated HTML page that is created for each individual customer. Each HTML page will be deleted after the call back and its associated session is completed. Additionally, it can be deleted if the call back did not succeed.

After the login page is created and is downloaded to the customer's browser, another copy of the JAVA applet is downloaded at a step 118.

Figure 2B:
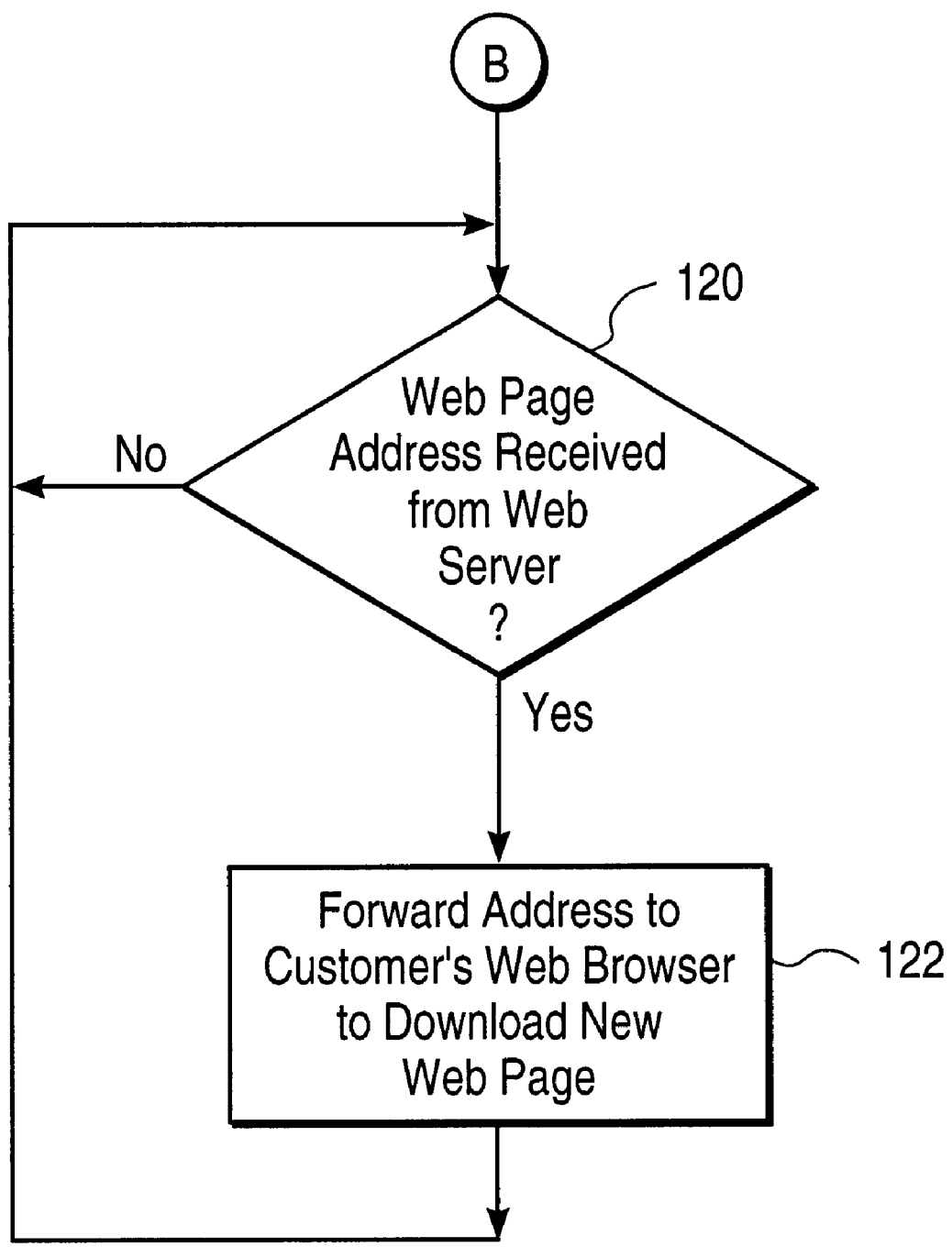

Turning now to FIG. 2B, the push applet continually monitors the socket IP connection between the applet and the push server for packets to be transmitted from the push server. This process continues until a web address is received from the push server at a step 120. Once a packet containing a web address is received, the push applet forwards the web address to the web browser program at a step 122. The web browser program in turn downloads the new web page. The applet maintains the IP connection to the push server until the browser program is terminated.

Figure 3:
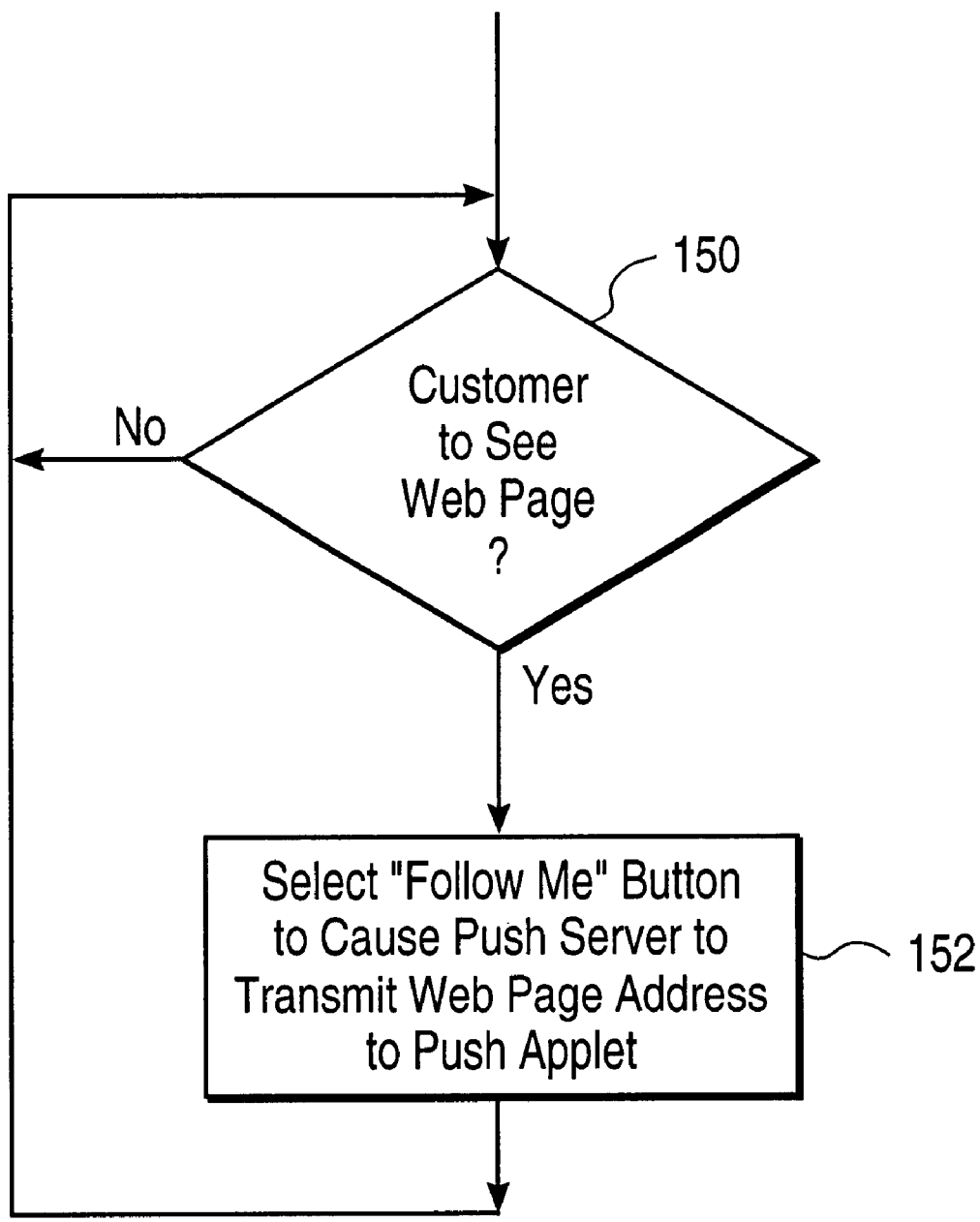
FIG. 3 illustrates the operation of a push applet that receives information from a remote push server and provides the information to a web browser program.

FIG. 3 illustrates the steps taken by the browser program running on the agent's terminal in order to allow the agent to control the information that is viewed by the customer's browser program. Beginning with a step 150, the agent decides whether a customer is to see a new web page. If not, the agent continues to discuss and answer questions regarding the information that is currently viewed on the customer's computer screen. If the agent decides that the customer is to see a new web page, then the user selects a "follow me" control on the agent's terminal, which causes the push server to transmit the web address of the selected web page to the push applet at a step 152. The push applet receives the address and forwards it to the customer's browser program so that the new web page is downloaded from the web server.

As will be appreciated from the above description, the present invention allows a remotely-located user to control the information that is seen by a customer's web browser program regardless of whether the web browser is currently connected to a web server associated with the customer service representative. The present invention operates without the use of a browser program that incorporates "push" technology. All that is needed is a JAVA compatible browser and the JAVA push applet as described.

The embodiments of the invention in which an exclusive property or privilege is claimed are defined as follows:

1. A method of remotely controlling the display of information on a computer that is running a non-push-compatible web browser program, comprising:

connecting the non-push-compatible web browser to a web server, downloading an applet to the non-push-compatible web browser, the applet establishing and maintaining an IP connection with a push server that is coupled to the web server, even if the connection between the non-push-compatible web browser and the web server is no longer established;

transmitting data that includes a web address from the push server to the applet over the IP connection without receiving a request from the web browser; and monitoring the IP connection to the push server for the data to be transmitted from the push server, wherein the applet receives the web address and provides the web address to the non-push-compatible web browser in order to control what is displayed on the web browser program.

2. A computer communication system, comprising:

a web server that stores information as a plurality of web pages, each of which has an associated address;

a remote computer system that is connected to the web server using a web browser program that lacks push technology, the remote computer running an applet program that is received from the web server, the applet establishing and maintaining an IP connection to a push server that is coupled to the web server even if the web browser program is disconnected from the web server, the push server being programmed to transmit a web address to the applet without receiving a request from the web browser program, the applet further operating to receive the web address from the push server and to supply the web address to the web browser program to download an associated web page.

3. The computer communication system of claim 2, wherein the applet maintains a connection to the push server by monitoring the IP connection for the address of a web page to be sent from the push server.

4. The computer communication system of claim 3, further comprising:

a terminal coupled to the web server that can view the web pages stored on the web server, the terminal being programmed to selectively direct the push server to transmit the address of a web page to the applet running on the web browser program.

* * * * *